US007198717B2

(12) United States Patent
Juby

(10) Patent No.: US 7,198,717 B2
(45) Date of Patent: Apr. 3, 2007

(54) ANOXIC BIOLOGICAL REDUCTION SYSTEM

(76) Inventor: Graham John Gibson Juby, 10540 Talbert Ave., Suite 200 East, Fountain Valley, CA (US) 92708

( * ) Notice: Subject to any disclaimer, the term of this patent is extended or adjusted under 35 U.S.C. 154(b) by 139 days.

(21) Appl. No.: 10/929,035

(22) Filed: Aug. 26, 2004

(65) Prior Publication Data
US 2006/0043018 A1 Mar. 2, 2006

(51) Int. Cl.
*C02F 3/00* (2006.01)
(52) U.S. Cl. .................. 210/202; 210/252; 210/532.1; 210/610
(58) Field of Classification Search ................ 210/605, 210/610, 252, 202, 532.1
See application file for complete search history.

(56) References Cited

U.S. PATENT DOCUMENTS

| 4,000,065 A | 12/1976 | Ladha |
| 4,518,399 A | 5/1985 | Croskell |
| 4,725,357 A | 2/1988 | Downing |
| 4,765,900 A | 8/1988 | Schwoyer |
| 4,781,836 A | 11/1988 | Thiele |
| 4,879,041 A | 11/1989 | Kurokawa |
| 5,028,336 A | 7/1991 | Bartels |
| 5,635,071 A | 6/1997 | Al-Samadi |
| 5,746,920 A | 5/1998 | Boergardts |
| 6,113,789 A | 9/2000 | Burke |
| 6,368,849 B1 | 4/2002 | Norddahl |
| 6,485,646 B1 * | 11/2002 | Dijkman et al. ............ 210/610 |
| 2005/0045557 A1 * | 3/2005 | Daigger et al. ............ 210/605 |

FOREIGN PATENT DOCUMENTS

| JP | 2-207899 A | 8/1990 |
| JP | 2-29290 A | 2/1997 |
| JP | P2003-200198 A | 7/2003 |

* cited by examiner

*Primary Examiner*—Chester T. Barry
(74) *Attorney, Agent, or Firm*—Dennis W. Beech

(57) ABSTRACT

The anoxic biological reduction system and method for treating wastewater may be an anoxic biological reduction element disposed in a membrane anaerobic stabilization system. The wastewater may be treated to produce an effluent suitable for membrane filtration with the treating incorporating processes substantially free of aerobic biological treatment. The effluent may be filtered through a membrane element selected from the group consisting of a microfiltration system and an ultrafiltration system or a combination thereof. The membrane effluent may then be treated in an anoxic biological reduction element to produce a process effluent stream.

9 Claims, 1 Drawing Sheet

ANOXIC BIOLOGICAL REDUCTION SYSTEM

CALL OUT LIST FOR DRAWING ELEMENTS 10 wastewater treatment system
12 pretreatment system
14 pretreatment effluent
16 recycle stream
20 screen element
24 screened effluent
30 membrane element
32 effluent fluid
34 waste steam
40 solids thickening element
42 solids stream
50 secondary membrane element
52 effluent stream
60 high rate anaerobic digestion system
62 methane gas
64 digestion system fluid effluent
70 separation process
72 separation stream
74 disposal stream
90 anoxic biological reduction element
92 supplemental chemical
94 process effluent stream
96 process feed stream
100 wastemwater influent

BACKGROUND OF THE INVENTION

This invention relates to systems and processes for reduction of the concentration of organic material and other constituents from an effluent stream produced in membrane anaerobic stabilization systems that may use conventional primary treatment of wastewater influent that may then be treated using processes substantially free of aerobic biological treatment to produce an effluent suitable for membrane filtration. The effluent may be treated with a membrane filtration system that may use a microfiltration system, an ultrafiltration system, a nanofiltration system, a reverse osmosis system, or combinations thereof. The new system and process may introduce an anoxic biological reduction process to reduce the concentration of organic material and other constituents as part of the filtration process stages.

Currently known methods for producing a treated effluent to meet secondary discharge standards, as defined by the US Environmental Protection Agency, typically include an aerobic oxidation process. The instant invention may meet secondary standards using physical separation and anoxic treatment for stabilization of the biodegradable organic compounds. In addition to removal of organic material, the process may allow combined treatment and/or removal of other potential pollutants in wastewater, such as, nitrate and perchlorate ions.

SUMMARY OF THE INVENTION

The present invention is directed to systems and methods for treating wastewater. The wastewater may be treated to produce an effluent suitable for membrane filtration with the treating incorporating processes substantially free of aerobic biological treatment. The effluent may be filtered through a membrane element selected from the group consisting of a microfiltration system and an ultrafiltration system or a combination thereof. The membrane effluent may then be treated in an anoxic biological reduction element to produce a process effluent stream.

These and other features, aspects and advantages of the present invention will become better understood with reference to the following drawings, description and claims.

DETAILED DESCRIPTION

Figure 1:
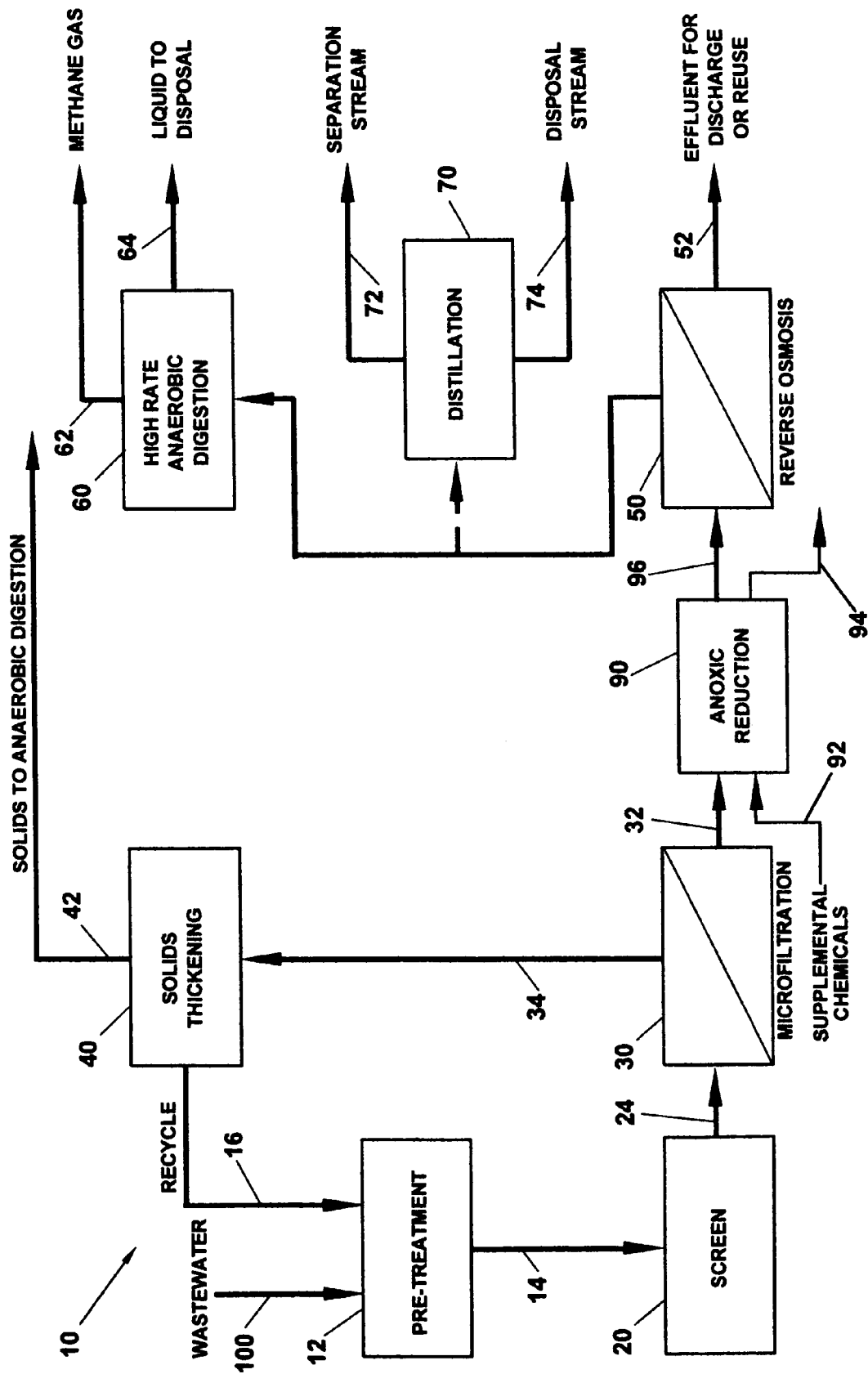
FIG. 1 illustrates a functional diagram of an anoxic biological reduction system in combination with an example membrane anaerobic stabilization system according to an embodiment of the invention.

The following detailed description represents the best currently contemplated modes for carrying out the invention. The description is not to be taken in a limiting sense, but is made merely for the purpose of illustrating the general principles of the invention.

Referring to FIG. 1, a functional diagram of an anoxic biological reduction element 90 disposed in a membrane anaerobic stabilization system 10 is illustrated. For purposes of disclosure of the anoxic biological reduction element 90 in combination with a basically anaerobic process, the system 10 may have conventional pretreatment system 12 for wastewater influent 100. The pretreatment effluent 14 may then be filtered in screen element 20 to produce screened effluent 24 for membrane filtration. A membrane element 30 may produce an effluent fluid 32 and a waste stream 34. The waste stream 34 may be processed in a solids thickening element 40 to produce a solids stream 42 and a recycle stream 16.

The effluent fluid 32 from the primary membrane element 30 may be processed in an anoxic biological reduction element 90 to reduce the concentration of organic material and/or other constituents. For example, the inorganic perchlorate ion ($ClO_4$) may be removed from the effluent fluid 32 by processing in an anoxic biological reduction element 90. Effluent fluid 32 may need to be supplemented with an electron donor organic substrate or electron acceptor as a supplemental chemical 92 to achieve the desired removal of constituent. In another example, an electronic acceptor 92, such as nitrate ion ($NO_3$), may be added to the effluent fluid 32 to receive treatment in an anoxic biological reduction element 90 to achieve the desired removal of soluble organic material. Other examples of electron acceptor supplemental chemicals may be sulfate and bromate and of electron donor supplemental chemicals ethanol, methanol, corn syrup, molasses and the like.

The anoxic biological reduction element 90 effluent may be used as a process feed stream 96 for a secondary membrane element 50 to be further processed. The anoxic biological reduction process 90 process effluent stream 94 may also be disposed or beneficially used without further processing in the system. The secondary membrane 50 may be in communication with other elements such as a distillation element 70 outputting a separation stream 72 and disposal stream 74 and a high rate anaerobic digestion element 60 outputting a methane gas 62 and liquid 64 for disposal. The secondary membrane 50 may also output an effluent 52 for discharge or reuse.

EXAMPLE

The following experimental example illustrates the use of the system when practicing the method of the invention.

Wastewater to be purified may be contaminated with soluble organic material represented by a $BOD_5$ concentration of 60 mg/L. The volatile acid speciation of the wastewater showed an acetic acid concentration of 30 mg/L. The wastewater had a suspended solids concentration of generally less than 1.0 mg/L, a nitrate ($NO_3^-$—N) concentration of zero and a sulfate concentration of about 250 mg/L. The temperature of the wastewater may be between 16 and 26 degrees C. and the pH may be between 7.0 and 7.3.

The wastewater may be fed via conduit 32 to the anoxic biological reduction element 90 that may be a 450 mm diameter 250 L high density polyethylene cylindrical reactor containing between 95 L and 115 L of granular sludge. The reactor may be operated at ambient temperature. The granular sludge, in pellet form, may be obtained from a commercial Upflow Anaerobic Sludge Bed (USAB) reactor operating on brewery effluent. Fixed film forms of the reactor, such as, a fixed media reactor, and like material may also be used. Electron acceptor material in the form of nitrate ion ($NO^-_3$), for example, may be dosed via conduit 92, in the form of calcium nitrate solution, at approximately 125 mg/L ($NO^-_3$—N) to the feed water entering the reactor.

The reactor may be arranged such that feed may be introduced to the base of the reactor and flowed up through the granular sludge. The hydraulic detention time in the reactor may be between approximately 10 minutes and 4 hours. A settling arrangement may be placed on top of the reactor that may allow solids to separate from the effluent stream and remain in the reactor. While granular sludge in pellet from was used for the experiment, other support media for bacterial growth may be used, for example, sand, plastic and like support material for bacterial growth.

The treated effluent stream 94 may contain soluble $BOD_5$ of less than 30 mg/L, an acetic acid concentration below the detection limit, 3.3 mg/L, a suspended solids concentration of less than 30 mg/L, and a nitrate ion concentration of between 4 and 15 mg/L ($NO^-_3$—N), based on more than six months of operating data.

Other operating conditions may include situations with nitrate and/or perchlorate ion in the wastewater that may be purified and with different combinations of concentration. The use of supplemental chemical source 92 in the form of electron donor, such as acetic acid, or electron acceptor, such as, oxygen, nitrate or perchlorate, may depend on the combination of chemical constituents in the feed stream and the treatment objectives. Supplemental chemicals may be supplied from purchased chemical sources or as constituents from other waste streams.

While the invention has been particularly shown and described with respect to the illustrated embodiments and examples thereof, it will be understood by those skilled in the art that the foregoing and other changes in form and details may be made therein without departing from the spirit and scope of the invention.

I claim:

1. A system for treating a wastewater stream comprising:
    a pretreatment system substantially free of aerobic biological treatment in communication with a wastewater influent;
    a screen element in communication with said pretreatment system;
    a membrane element in communication with said screen element; and
    an anoxic biological reduction element in communication with said membrane element to process an effluent fluid from said membrane element to produce a process effluent stream.

2. The system as in claim 1 wherein said process effluent stream is further filtered in a secondary membrane element.

3. The system as in claim 1 wherein there is a supplemental chemical source in communication with said anoxic biological reduction element.

4. The system as in claim 1 wherein said anoxic biological reduction element is operated at approximately ambient temperature.

5. The system as in claim 1 wherein said anoxic biological reduction element is structured for an effluent fluid to be introduced at a base of said anoxic biological reduction element to be flowed upwardly through a media containing a sludge material.

6. The system as in claim 1 wherein a hydraulic detention time in said anoxic biological reduction element is between 10 minutes and 4 hours.

7. The system as in claim 1 wherein a settling element is disposed at the top of the anoxic biological reduction element.

8. The system as in claim 3 wherein said supplemental chemical is an electron acceptor.

9. The system as in claim 8 wherein said supplemental chemical is selected from the group of oxygen, nitrate, sulfate, bromate and perchlorate.

* * * * *